United States Patent [19]

Ley

[11] Patent Number: 4,558,745
[45] Date of Patent: Dec. 17, 1985

[54] MACHINE FOR WORKING SOIL HAVING DRIVINGLY OSCILLATED SOIL-WORKING TOOL

[75] Inventor: Carl Ley, Düren, Fed. Rep. of Germany

[73] Assignee: Bucher Guyer A.G., Niederweningen, Switzerland

[21] Appl. No.: 395,083
[22] PCT Filed: Sep. 30, 1981
[86] PCT No.: PCT/CH81/00108
§ 371 Date: Jun. 2, 1982
§ 102(e) Date: Jun. 2, 1982
[87] PCT Pub. No.: WO82/01114
PCT Pub. Date: Apr. 15, 1982

[30] Foreign Application Priority Data
Oct. 2, 1980 [CH] Switzerland ............... 7353/80

[51] Int. Cl.⁴ .................. A01B 19/06; B62D 51/04
[52] U.S. Cl. ........................... 172/42; 172/102
[58] Field of Search .............. 172/40, 54.5, 101, 102, 172/41, 42, 43, 69, 198, 378, 691, 694, 697, 84, 93; 404/119, 120, 102; 56/296, 298, 307

[56] References Cited

U.S. PATENT DOCUMENTS

| | | | |
|---|---|---|---|
| 269,494 | 12/1882 | Winn | 172/691 |
| 1,481,148 | 1/1924 | Preuss | 172/378 |
| 1,917,604 | 7/1933 | Scranton, Jr. | 56/298 |
| 2,038,498 | 4/1936 | Mosel | 404/119 |
| 2,744,456 | 5/1956 | Mittelstadt | 404/116 |
| 3,404,644 | 10/1968 | Vissers | 172/102 X |
| 3,500,936 | 3/1970 | Vigen | 172/198 |
| 3,883,259 | 5/1975 | Berg et al. | 404/120 |
| 4,030,873 | 6/1977 | Morrison | 404/119 X |
| 4,224,995 | 9/1980 | Alberger | 172/697 X |

FOREIGN PATENT DOCUMENTS

| | | | |
|---|---|---|---|
| 1022404 | 1/1956 | Fed. Rep. of Germany . | |
| 1105007 | 6/1955 | France . | |
| 1564217 | 3/1969 | France . | |
| 567295 | 10/1957 | Italy | 56/296 |
| 240713 | 5/1946 | Switzerland . | |
| 294262 | 1/1954 | Switzerland | 172/42 |
| 311100 | 1/1956 | Switzerland . | |
| 310738 | 3/1956 | Switzerland . | |
| 332396 | 9/1958 | Switzerland . | |
| 448588 | 12/1967 | Switzerland . | |

*Primary Examiner*—Richard T. Stouffer
*Attorney, Agent, or Firm*—Marmorek, Guttman & Rubenstein

[57] ABSTRACT

A machine for working soil, and arranged to have a predetermined direction of movement, includes a soil-working implement adapted to be driven over the soil, and to execute oscillations in a direction at an angle to the predetermined direction, and a soil-leveling tool connected to the soil-working implement.

8 Claims, 5 Drawing Figures

MACHINE FOR WORKING SOIL HAVING DRIVINGLY OSCILLATED SOIL-WORKING TOOL

It is known to employ harrows, tillers and/or other earth moving equipment when working with soil, particularly for the construction of gardens, parks, and similiar facilites in which the soil is turned over to a depth of up to 50 cm., or loosened. In this work the soil must be passed through several times, so as to obtain a loosened earth crust. This preparation of the soil by a machine is not, however, sufficient in order to obtain an adequately smooth soil surface of a suitable fine consistency to plant the seed in the soil, so that a subsequent crushing of the earth, which includes large lumps, as well as a smoothing of the soil surface is unavoidable. Usually this type of work is accomplished by a pick or a rake to smooth out the soil surface, which entails time-consuming raking anyhow to obtain such a smooth surface. Altogether work of this type is very costly and time-consuming. Furthermore, as a result of this deep penetration or tearing open of the soil, the capillary layer is destroyed, which results in interrupting the supply of fluid nutrition for the seeds or plants.

It is known to use a machine of the aforedescribed type as a harrow from Swiss Pat. Nos. CH 310,738, 311,100, 332,396 and 448,558, in which a soil-working implement, which is arraged to oscillate in a direction transverse or at an angle to the direction of travel is provided with prongs reaching into the soil. These prongs, deeply reaching into the soil and oscillating transverse to the direction of travel or movement of the machine although reinforcing the crushing action of the harrow, result in the soil being only turned over to a considerable depth in a disadvantageous manner, without obtaining a smooth surface in which seeds can be planted.

SUMMARY OF THE INVENTION

It is an object of the invention to devise a machine of the aforesaid kind, while obviating the aforesaid disadvantages, in which the soil can be worked at a considerably reduced operating effort and reduced machine utilization in such a manner that while the capillary layer is maintained, there is additionally obtained an approximately smooth surface.

This object is attained, according to the invention, by the soil implement, which is arranged to execute oscillations in a direction transverse to the direction of travel, including a soil-leveling tool. This inventive solution permits, on one hand, that the engagement of the soil working implement with the soil is adjusted precisely to a certain depth by means of the soil-leveling tool, which is essential for the preparation of the upper soil layer, the so-called upper soil. The capillary layer required for the supply of liquid nutrition of the soil, which is destroyed by known earth working processes, as a result of the loosening of the soil to too great a depth, can be maintained unimpaired thereby. Additionally, due to the soil leveling tool, which extends within or along an upper region of the originally hard and not yet loosened soil, the loosened material is maintained in motion and advanced ahead of the soil leveling tool. Behind the soil-leveling tool there is therefore formed a loose and thin upper layer, alternatively called loosening layer, while therebelow there is maintained the thickened capillary layer. Thus, supply of nutrition from the soil is ensured, and simultaneously a smooth surface capable of receiving seeds is obtained. As a result of the loosening layer, oxygen also penetrates to the roots of the plants, thus facilitating the necessary growth of bacteria.

In a preferred version of the invention, a stationary crossbeam is arranged behind the soil-level tool as viewed in the direction of travel. This cross-beam supplements advantageously the effect of the soil-leveling tool, and simultaneously permits an additional abutment or stabilization along a wide surface, and guidance of the machine on the surface of the soil.

The soil-leveling tool of the machine is advantageously formed so that it has a cross section in the form of an angle, one of the blades thereof extending substantially parallel to the surface of the soil from the apex of the angle in a direction opposite to the direction of travel, while the other blade extends approximately vertically upwards. Thus the approximately vertically extending blade is advantageously suited to push the loosened earth ahead thereof, and keep it in movement, while the blade extending parallel to the soil performs primarily a soil-leveling action.

An embodiment advantageous, because of its simple construction, includes guidance means arranged to displace the soil-leveling tool along the stationary cross beam in a direction transverse to the predetermined direction.

In addition to the guidance of the soil-leveling tool in a simple manner during oscillation of the soil-leveling tool in a direction transverse to the direction of travel, accomplished through the guidance means, there is obtained the further substantial advantage in a functional manner due to the soil-leveling tool executing an arcuate to and fro movement as a result of the pivoting of the guidance means through pivots, so that the earth to be crushed or broken up, is advanced periodically stepwise. It has been shown that this additional forward movement influences very favorably the quality of the loosening layer.

So as to guide the soil-leveling tool in its oscillations executed in a direction transverse to the direction of travel in a further embodiment of the invention the soil-leveling tool is disposed between the stationary cross beam and guide plates disposed thereon, so that it can slide in a direction transverse to the direction of travel. In this connection it is advantageous, if the blade of the soil-leveling tool, extending parallel with the soil, is disposed substantially in the plane of the stationary cross beam. The problem of guiding the soil-leveling tool in a direction transverse to the direction of travel is advantageously solved by the blade of the soil-leveling tool extending in the direction parallel to the soil, and being provided within a region near to the stationary cross beam with an upwardly projecting extension member, so that the upwardly projecting extension member forms guidance means slidably overlapping the stationary cross beam.

An alternate advantageous solution in this respect is achieved if a cross-plate is mounted on a portion of the blade extending in the direction parallel to the soil, so that the plate forms guidance means slidably overlapping the stationary cross beam.

So that the necessary loosening of the upper layer of the soil, in addition to the smoothing action can be accomplished, the soil-leveling tool in the invention is provided along its operating width extending transverse to the direction of travel with a plurality of prongs pointing downwardly towards the soil. In one embodiment of the invention the prongs are advantageously exposed on a front side of the soil leveling tool, as viewed in the direction of movement of the machine. This embodiment is functionally particularly advantageous, as the soil is therefore loosened on a front side of the soil leveling tool, so that its pushing action and planing action is particularly effective. As far as the formation of the prongs is concerned, it is particularly advantageous, if the prongs have a free pointed end. It has been shown furthermore particularly advantageous for determining the depth of penetration in the soil, in which the soil surface is loosened, if the length of the protruding prongs is about 7 cm., that oscillatory movement of the soil leveling tool taking place in a direction transverse to the travel direction is accomplished by an oscillatory drive.

Within the scope of the invention it is further provided that oscilatory movement of the soil leveling tool taking place in a direction transverse to the travel direction is accomplished by an oscillatory device including a rotatable drive shaft, and by a power take-off shaft coupled to the soil leveling tool. An embodiment of this type permits, for example, for the machine to be rotatably driven by a trunnion or shaft of any prime mover, to which the machine may be releasably coupled. The oscillatory drive advantageously includes a crank drive in the form of planetary gears, as a result of which favorable operating properties of the oscillatory drive are obtained.

In a particularly preferred version of the invention the oscillatory drive is disposed on the stationary cross beam. This yields a particularly compact construction, which is particularly suitable to be coupled in a simple manner as a drive to another vehicle.

An advantageous construction of the invention device is particularly obtained, if the power take-off shaft of the oscillatory drive is coupled to the soil-leveling tool by entrainment means secured to the soil-leveling too, and engageable with the power take-off shaft.

The high efficiency and practical use of the invention is particularly effective in connection with a device, in which the drive means is formed by a tractor having a single axle and including a boom extending in the direction of travel and having a rotatable drive spindle, in which the oscillatory drive, according to the invention is directly connectable to the free end of the boom, and wherein the drive shaft of the oscillatory drive is in positive lock with the rotatable drive spindle. In addition to the easy maneuverability of such a tractor having a single axle important for constructing gardens, there is obtained the additional advantage that the machine can be replaced by other devices, for example, a mower.

Within the scope of the invention in a further embodiment there is superimposed onto the oscillations of the soil leveling tool taking place tranverse to the direction of travel an oscillating component acting along the direction of travel. Such a superimposed oscillation component, which results in a stepwise movement of the soil-leveling tool and of the prongs in the direction of travel, is very advantageous for the loosening action of the soil. Any known drive means can be used for superimposing such oscillations.

BRIEF DESCRIPTION OF THE DRAWINGS

Further details, advantages and features of the invention will become evident from the following description and the drawing, in which.

DESCRIPTION OF THE PREFERRED EMBODIMENTS

Figure 1:
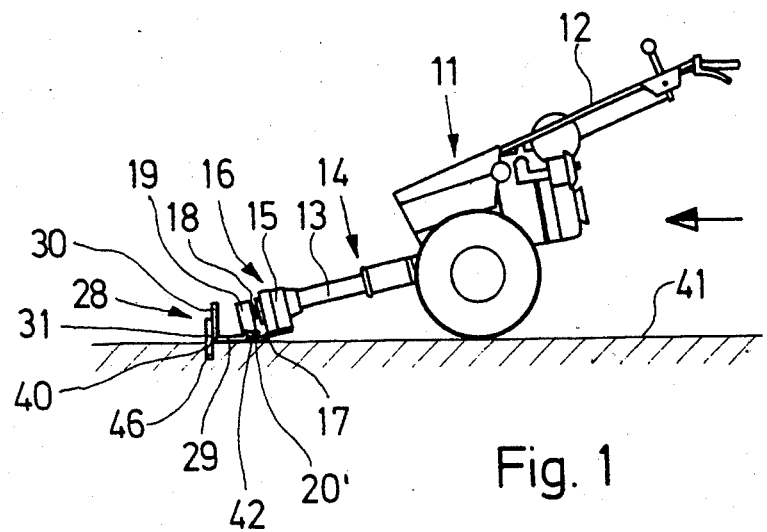
FIG. 1 is a side view of a device for working the soil in connection with a tractor having a single axle.
Figure 2:
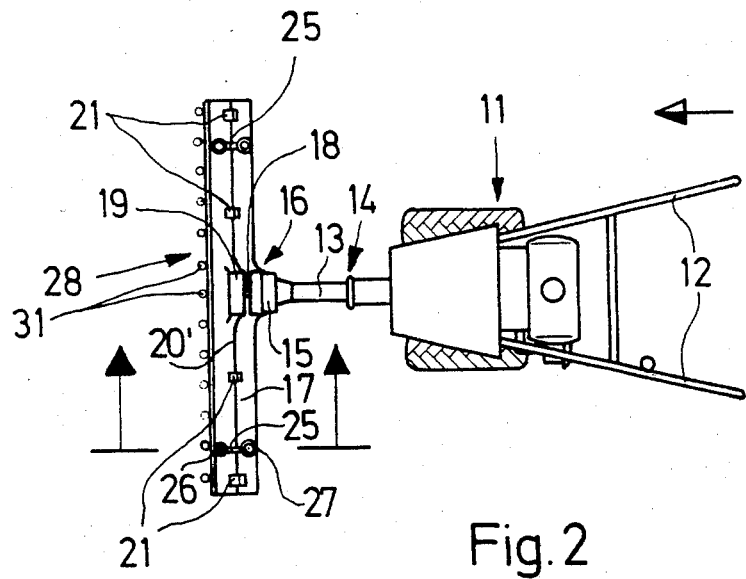
FIG. 2 is a plan view of the device shown in FIG. 1.

A device for working the soil shown in view in FIGS. 1 and 2 includes as propelling drive a self-propelled single-axle tractor 11, which can be guided by means of guide bars 12, on whose front side there is secured a rotatable drive shaft 13 for a machine including a boom 14. The tubular boom 14 is connected to a gear housing 15 of an oscillatory drive in the form of a so called "Roto-Flex" drive, or of a crank drive 16, which is disposed on a cross beam 17, which extends transverse to the direction of travel of the tractor 11 and is arranged to slide on the soil.

The "Roto-Flex" gear drive 16 includes planetary gears disposed in the interior of the drive housing 15, which includes a ring gear provided with teeth on the interior thereof, and a planetary wheel meshing therewith, which in turn is secured to a crank shaft concentrically disposed with the ring gear. As a result of the relative rotary motions on one hand of the crankshaft about the center of the ring gear, and on the other hand of the planetary wheel about is own axis of rotation, the vertical motion of a power take-off shaft 18, which is connected to the crank shaft at the output end of the shaft, is completely cancelled. Thus the power take-off shaft moves only to and fro horizontally, and engages entrainment means 19 disposed on a soil leveling tool 28.

Figure 3:
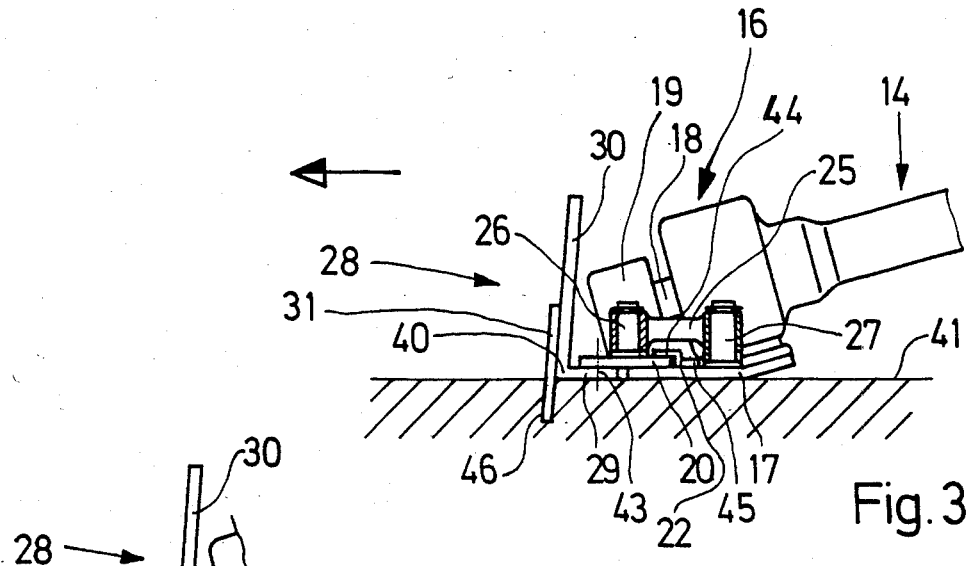
FIG. 3 is an enlarged cross-section along the line II—II of FIG. 2.
Figure 3A:
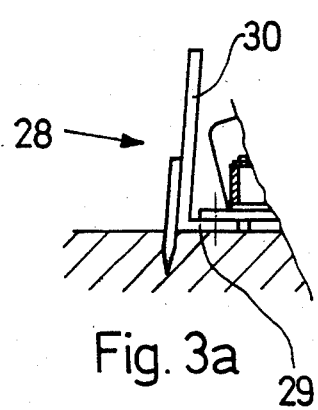
FIG. 3a is a portion of FIG. 3, showing an alternate embodiment of the prongs.

As can be seen in detail from FIG. 3, the soil-leveling tool 28 has a cross-section in the form of an angle, one blade 29 of which extends from an apex 40 of the angle in a direction opposite to the direction of movement of the machine and parallel to the soil surface 41, on which it is arranged to glide. The other blade 30 of the soil leveling tool 28 in the shape of an angle extends from the apex 40 thereof in an approximately vertical direction upwards, and is slightly inclined rearwardly with respect to the direction of movement of the machine, as shown in FIG. 3. Furthermore in the embodiment shown in both FIG. 1 and FIG. 3, the blade 29 extending parallel to the surface of the soil 41 is disposed substantially in the same plane as the stationary cross beam 17.

In the embodiment illustrated in FIG. 3, a cross plate 20 is disposed in the blade 29 extending parallel to the surface of the soil, and is secured to the blade 29, for example by screws 43 so that it slidably overlaps the stationary cross beam 17. The entrainment means 19 is thus secured to the cross plate 20, which constitutes an oscillating member. By releasing the screws 43, the soil-leveling tool 28 can be detached from the cross plate 20, so that the soil leveling tool 28, which is subject to wear and tear, may be easily replaced.

In contrast thereto, in the embodiment of FIG. 1, the blade 29 of the soil leveling tool 28, which extends parallel to the ground, is provided in the region near to the stationary cross beam 17 with an upwardly projecting extension member 42, which extends transverse to the direction of travel along the blade 29. The upwardly extending portion 20' of the blade 29 overlaps slidingly the stationary cross beam 17 in the same manner as the cross plate 20 shown in the embodiment of FIG. 3. As in the embodiment shown in FIG. 3, in which the entrainment means 19 is secured to the cross plate 20, which forms an oscillatory member, in the embodiment shown in FIG. 1 the entrainment means 19 is secured to the upwardly extending region 20', which forms the oscillating member.

In both embodiments of FIGS. 1 and 3, the oscillating member or beam 20 or 20' is slidably guided along the cross beam 17 by holding-down means 21. The holding-down means 21 includes a plurality of step-like guide plates 22, whose upper portion 44 is loosely disposed on the oscillating cross plate 20, and whose lower portion 45 threaded onto the stationary cross beam 17. By means of an adjusting screw 23 and fastening screws 24, the position of the guide plate 22 can be adjusted and secured so as to equalize any wear and tear occuring during use.

The oscillating member 20 or 20' is further held firmly in the form of at least two guide arms 25, each of which is pivoted with one end thereof on the stationary cross beam 17, and other end thereof on the oscillating member 20 or 20'. For this purpose the oscillating member 20 and 20', as well as the stationary cross beam 17 are provided with upwardly extending tenons 26, and 27, on which the arms 25 are securely positioned, as is illustrated in more detail in FIGS. 3 and 4.

Instead of the slightly arcuate movement of the oscillating member 20 or 20' which is due to the constraints in which the arms 25 are guided, it is possible in another embodiment of the device to obtain a completely linear to and fro motion using a positive-locking guidance.

Figure 4:
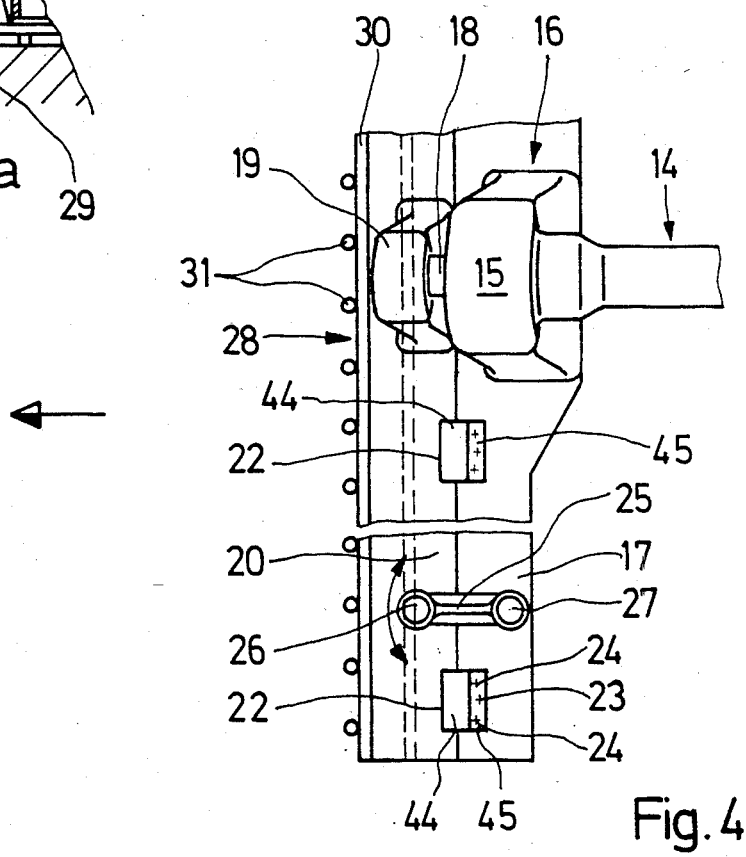
FIG. 4 is a plan view according to FIG. 3.

As can be further seen from FIGS. 1 and 4, there extend on the front side of the soil leveling tool formed by the approximately vertically directed blade 30 rod-like prongs 31, which are periodically spaced over the entire width of the soil-leveling tool 28, which extends transverse to the direction of travel. These prongs project with their free lower ends 46 beyond the blade 29 of the soil leveling tool 28, which extends parallel to the soil surface 41, and penetrate into the soil. As the soil-leveling tool 28 with its prongs 31 is subjected most severely to wear and tear, it is made to be replaceable. The prongs 31 preferably have a cylindrical shape, but may have any other suitable shape in cross-section. Their lower ends 46 may be cone-shaped and have a pointed end. As in one embodiment of the machine the prongs 31 are dimensioned so that about 7 cm. of their length penetrate into the firm soil and disrupt the soil, the soil is thereby loosened up to a maximum depth of 10 cm., so that there is generated a loose and thin upper layer, also called loosening layer, while therebelow the thickened capillary layer remains maintained.

I claim:

1. A machine for working soil, and arranged to have a predetermined direction of movement, comprising in combination: mounting means,
   a soil-working tool mounted on said mounting means, said soil working tool adapted to be driven over the soil, and to be in engagement therewith, and adapted to oscillate relative to said mounting means in a direction at an angle to said predetermined direction, and
   having an operating width extending at an angle to said direction of movement,
   drive means for drivingly oscillating said soil-working tool relative to said mounting means,
   said soil-working tool having approximately an angular cross-section, and including two blades forming an apex, one of said blades extending from said apex in a direction opposite to said direction of movement, and being adapted to extend substantially parallel to the soil, the other of said blades extending in an upright direction, substantially at right angles to said one of said blades, and
   a plurality of prongs arranged on said soil-working tool along said operating width, said prongs adapted to extend downwardly towards the soil, and being disposed on a front side of said upright blade of said soil working tool, said front side facing away from said blade adapted to extend substantially parallel to the soil.

2. A machine as claimed in claim 1, wherein said mounting means includes a stationary cross-beam arranged behind said soil-working tool as viewed in said direction of movement, said soil-working tool being disposed on said stationary cross-beam.

3. A machine as claimed in claim 2, further comprising guidance means arranged to displace said soil-working tool in a direction at an angle to said predetermined direction along said stationary cross-beam.

4. A machine as claimed in claim 3, further comprising guide plates disposed on said cross-beam, and wherein a portion of said soil-working tool is arranged to slide along said direction at an angle to said predetermined direction between said guide plates and said cross-beam.

5. A machine as claimed in claim 2, wherein said stationary cross-beam is substantially disposed in a plane, and wherein said blade extending in the direction substantially parallel to the soil is substantially disposed in said plane.

6. A machine as claimed in claim 5, wherein a portion of said blade adapted to extend in the direction substantially parallel to the soil is disposed near said stationary cross-beam, and includes an upwardly projecting extension member, and wherein a portion of said extension member slidably overlaps said stationary cross beam.

7. A machine as claimed in claim 5, further including a plate mounted on a portion of said blade adapted to extend in the direction substantially parallel to the soil, said plate slidably overlapping said stationary cross-beam.

8. A machine as claimed in claim 2, wherein said drive means includes a tractor having a single axle, said tractor including a boom generally extending in said predetermined direction, and including a rotatable drive spindle, and said drive means providing the oscillating drive to said soil-working tool by oscillatory means drivable by said drive means, said soil-working tool being detachable from said stationary cross-beam.

* * * * *